3,709,891
MANUFACTURE OF LYSERGOLS
Eckart Eich, Marienborn, and Hans Rochelmeyer, Mainz, Germany (both % Farbwerke Hoechst AG, Frankfurt am Main, Germany)
No Drawing. Filed June 24, 1970, Ser. No. 49,564
Claims priority, application Germany, July 12, 1969, P 19 35 556.7
Int. Cl. C07d 43/20
U.S. Cl. 260—285.5                    5 Claims

ABSTRACT OF THE DISCLOSURE

Method for making lysergol or $N_1$-lower alkyl lysergols from elymoclavine or $N_1$-lower alkyl elymoclavine by heating in an organic solvent in the presence of activated aluminum oxide alone, or in the presence of aluminum oxide or charcoal in combination with certain metal oxides or certain noble metals.

---

The present invention relates to methods for making lysergol or $N_1$-lower alkyl lysergols from elymoclavine or $N_1$-lower alkyl elymoclavine.

Two processes have been described for the preparation of lysergol starting from elymoclavine, an isomer of lysergol characterized by a double bond in 8(9) position, and easily obtainable from certain strains of the fungus *Claviceps purpurea*, namely:

(a) heating of elymoclavine with sodium butylate [Bull. Agr. Chem. Soc. Japan 20, 95 (1956)].
(b) heating of elymoclavine with potassium hydroxide in methanol in a bomb tube [Helv. Chim. Acta 41, 1984 (1958)].

However, both processes give only small yields of lysergol, isolysergol and lysergene being primarily obtained, and, hence, are not suitable for the practical manufacture of lysergol.

A process has now been found for the preparation of lysergol or $N_1$-lower alkyl-lysergols from elymoclavine or, respectively, $N_1$-lower alkyl-elymoclavines which eliminates the drawbacks mentioned, said process consisting in heating elymoclavines of the Formula I in which R represents an alkyl radical having from 1 to 4 carbon atoms with a sorbent, for example with activated aluminum oxide or charcoal, optionally in conjunction with a metal oxide, or with a metal catalyst, preferably a noble metal, on a suitable carrier, for example aluminum oxide, charcoal, calcium carbonate or barium sulfate, in the presence of an organic solvent. In this process, the compounds of Formula I are rearranged almost quantitatively into lysergols of Formula II. Isolysergol is not formed, neither does formation of lysergene occur. The lysergols are thereby adsorbed at the sorbent and can in general be separated, along with the latter, from the solution by simple filtration. There are then freed from the adsorptive agent by elution with a suitable solvent

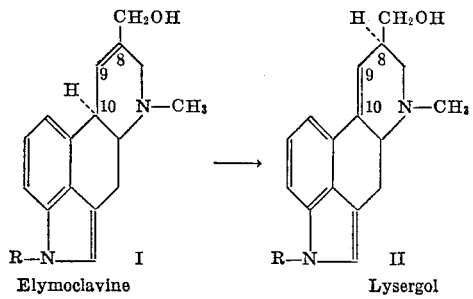

As adsorption agents, especially charcoal or activated neutral aluminum oxide may be used. However, basic or acid aluminum oxide having a corresponding activity can be used as well as organic solvent, preferably benzene or pyridine are used, furthermore halogenated hydrocarbons. The reaction time depends on the temperature applied which, in turn, depends on the solvent used. The higher the boiling point of the solvent the faster the reaction will proceed. For example, in boiling benzene the reaction is complete in about 18 hours. It can be substantially accelerated by adding to the adsorptive agent a noble metal catalyst such as rhodium, iridium, palladium or platinum. Suitable catalysts are, for instance, palladium on barium sulfate or calcium carbonate or nickel on aluminum oxide. The addition of a metal oxide to the adsorbent, for example the use of mixtures of $Cr_2O_3/Al_2O_3$, $MnO_2/Al_2O_3$, $TiO_2/Al_2O_3$ or $FeO_2/Al_2O_3$ also has an accelerating effect. With the use of said catalysts the reaction takes place within 1½–3 hours. For eluting the adsorbed products of the rearrangement, methanol or ethanol are preferably used. The elymoclavine used as starting compound can be prepared in known manner by saprophytic cultivation of certain strains of the ergot fungus. [Helv. Chim. Acta 37, 1815 (1954); 40, 1358 (1957); Planta Med. 9, 471 (1961).] N-substituted elymoclavines are obtained by methylating elymoclavine by known methods, e.g. with alkyl iodides in a solution of potassium in liquid ammonia. The rearrangement products of Formula II are valuable starting materials for the preparation of pharmaceutical products. For example the esterification of the —$CH_2OH$-group in the 8-position with organic acids leads to substances having uterus-contracting and antagonistic serotonine-antagonistic activity.

The following examples are to illustrate the invention. The parts and percentages are by weight unless otherwise stated.

EXAMPLE 1

50 g. of finely powdered elymoclavine were dissolved in 20 l. of boiling benzene while vigorously stirring. Subsequently, 750 g. of neutral (or acid or basic) aluminum oxide were added portionwise. After stirring and refluxing for 18 hours, the solvent was separated by filtration. The aluminum oxide was stirred several tmes wth methanol, and the methanol eluates were combined and concentrated. The lysergol which precipitated in crystals could be used for esterification without further purification. A sample recrystallized from ethanol melted at 253° C. (with decomposition).

EXAMPLE 2

50 g. of finely powdered elymoclavine were dissolved in 5 l. of boiling pyridine while vigorously stirring, and 750 g. of basic (or neutral) aluminum oxide were added portionwise. After refluxing for 12 hours, the solvent was eliminated by filtration. The aluminum oxide was stirred, several times, with methanol. Otherwise the same procedure as in Example 1 was followed. The same product as in Example 1 was obtained.

EXAMPLE 3

3 g. of finely powdered elymoclavine were dissolved in 4 l. of boiling benzene with vigorous stirring and, subsequently, 5 g. of palladium activated aluminium oxide (5% palladium) were added. After refluxing for two and a half hours, the solvent was removed by filtration. The residue was stirred several times with methanol and the collected eluates were worked up as described in Example 1. In the same manner $N_1$-methyl-elymoclavine could be rearranged into $N_1$-methyl lysergol.

EXAMPLE 4

5 g. of finely powdered elymoclavine were dissolved in 500 ml. of boiling pyridine while vigorously stirring and 10 g. of rhodium/aluminum oxide (5% Rh) ("Engelhard's catalyst") were added. After refluxing for one and a half hours, the batch was worked up as in Example 3. The same product was obtained.

EXAMPLE 5

5 g. of elymoclavine were dissolved in 500 ml. of boiling pyridine with vigorous stirring and 5 g. of platinum on charcoal (10% Pt) were added. Work-up was effected as in Example 3. The same product was obtained.

EXAMPLE 6

5 g. of elymoclavine were dissolved in 500 ml. of boiling pyridine, while vigorously stirring and, subsequently, 14 g. of chromium (III) oxide/aluminum oxide (40% $Cr_2O_3$) were added. Work-up was effected as in Example 3. The same product was obtained.

We claim:

1. A method for making lysergol or an $N_1$-lower alkyl lysergol, respectively, which consists essentially of heating elymoclavine or an $N_1$-lower alkyl elymoclavine, respectively, in an organic solvent selected from the group consisting of benzene, pyridine, or a halogenated hydrocarbon in the presence of activated aluminum oxide or a combination of (A) activated aluminum oxide or charcoal with (B) a metal oxide selected from the group consisting of $Cr_2O_3$, $MnO_2$, $TiO_2$, and $Fe_2O_3$, or with (C) a noble metal selected from the group consisting of rhodium, iridium, palladium, and platinum.

2. A method as in claim 1 wherein heating takes place in the presence of a combination of palladium and aluminum oxide.

3. A method as in claim 1 wherein heating takes place in the presence of a combination of rhodium and aluminum oxide.

4. A method as in claim 1 wherein heating takes place in the presence of a combination of platinum and charcoal.

5. A method as in claim 1 wherein heating takes place in the presence of a combination of $Cr_2O_3$ and aluminum oxide.

References Cited

UNITED STATES PATENTS

| | | | |
|---|---|---|---|
| 3,014,909 | 12/1961 | Rutschmann et al. | 260—285.5 |
| 3,029,243 | 4/1962 | Olin | 260—285.5 |
| 3,232,942 | 2/1966 | Hofmann et al. | 260—285.5 |

FOREIGN PATENTS

| | | | |
|---|---|---|---|
| 338,466 | 7/1959 | Switzerland | 260—285.5 |

OTHER REFERENCES

Yamatodani, et al., Bull. Agr. Chem. Soc. Japan, vol. 21, pp. 200–1 (1957).

Yamatodani, et al., Bull. Agr. Chem. Soc. Japan, vol. 20, pp. 95–6 (1956).

DONALD G. DAUS, Primary Examiner